June 6, 1933.  G. B. STANTON  1,912,800
ELECTRICAL CURRENT TESTING INSTRUMENT
Filed Aug. 24, 1931  2 Sheets-Sheet 1
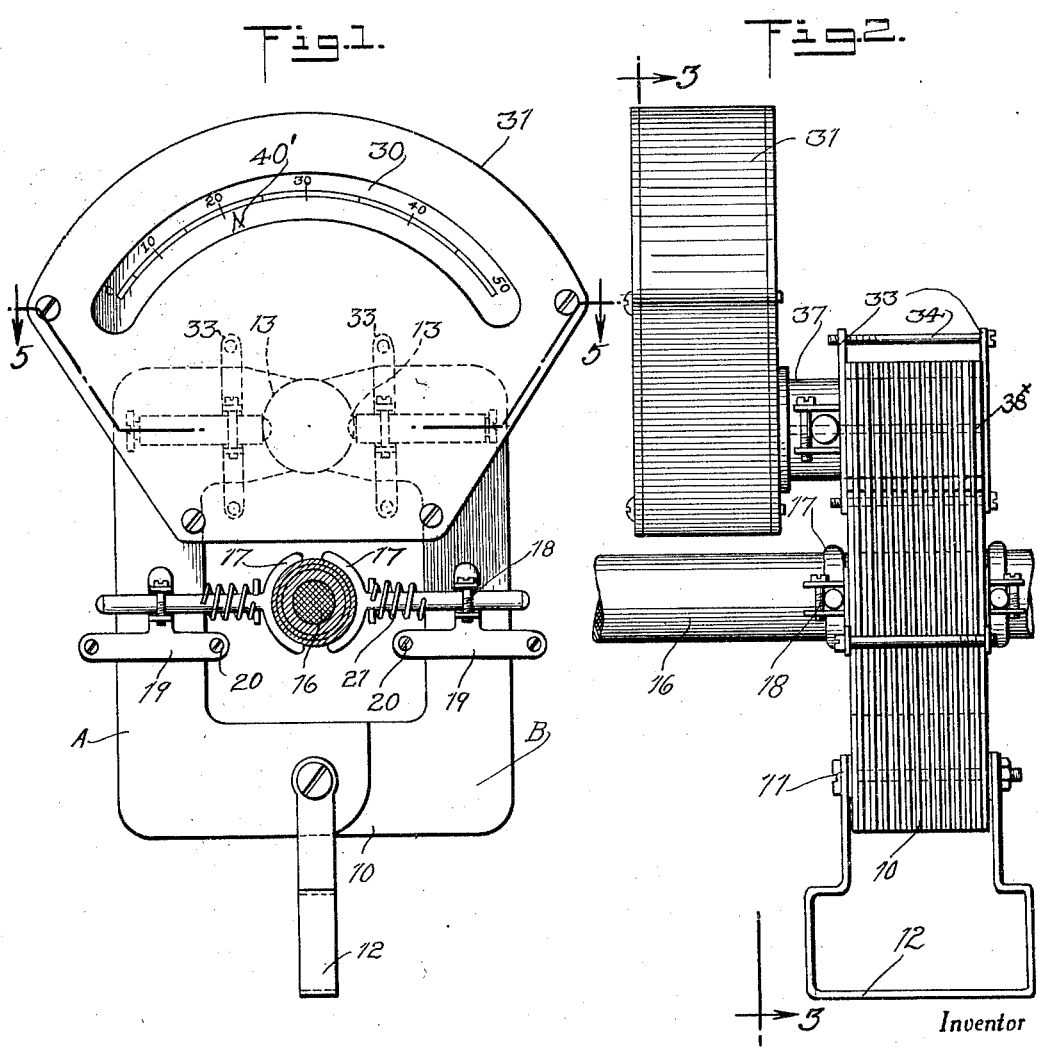
Inventor
GEORGE BASIL STANTON.
By Clarence A. O'Brien
Attorney June 6, 1933.   G. B. STANTON   1,912,800
ELECTRICAL CURRENT TESTING INSTRUMENT
Filed Aug. 24, 1931   2 Sheets-Sheet 2
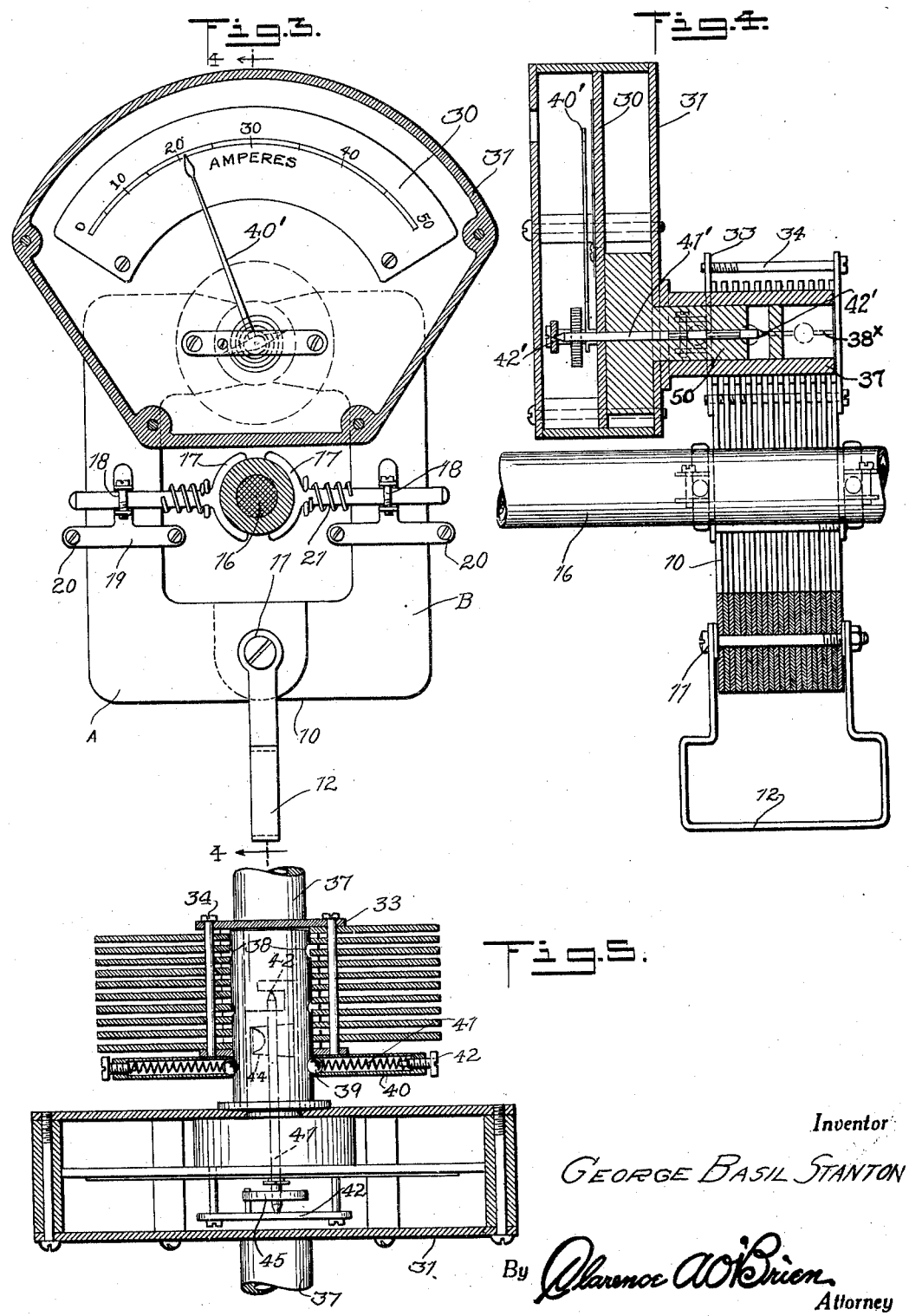
Inventor
GEORGE BASIL STANTON
By Clarence A. O'Brien
Attorney Patented June 6, 1933

1,912,800

REISSUED

UNITED STATES PATENT OFFICE

GEORGE BASIL STANTON, OF BROOKLYN, NEW YORK

ELECTRICAL CURRENT TESTING INSTRUMENT

Application filed August 24, 1931. Serial No. 559,066.

The present invention relates to new and useful improvements in electrical instruments, and more particularly it pertains to an electrical instrument for measuring electric current.

It is one of the primary objects of the invention to provide a measuring instrument which will measure current of either direct or alternating type.

A further object of the invention resides in a novel construction which particularly adapts the instrument for use in the testing of overhead or underground cables or similar conductors.

A further object of the invention resides in a novel construction whereby the testing operation may be carried out by a single person in a quick and highly efficient manner.

A further object of the invention resides in a novel construction whereby the device may be used in the testing of cables or electrical conductors of various diameters without interchange of parts.

A further object of the invention resides in a novel construction whereby the indicating means is adjustably and removably associated with a magnetic element by which it is operated.

With the above and other objects in view, reference will be had to the accompanying drawings wherein;

Figure 1 is a view in front elevation partly in section illustrating a device constructed in accordance with the present invention, Figure 2 is a side elevation thereof, Figure 3 is a vertical sectional view taken on the line 3—3 of Figure 2, Figure 4 is a sectional view taken on the line 4—4 of Figure 3, and;

Figure 5 is a top plan view partly in section taken on line 5—5 of Fig. 1.

Referring more particularly to the drawings, the device comprises a magnetic member 10 which comprises two portions A and B. Each of the portions A and B is formed of a plurality of separate plates of transformer steel and each may be either rectangular or circular in cross section. The two portions A and B are pivotally connected together as at 11, and a suitable bail or the like 12 may be employed at this point. By this construction, the two portions A and B are movable relatively to each other thus providing for their introduction over a cable of any desired size.

Each of the portions A and B is formed with a pole or terminal 13, and as illustrated in the drawings, these poles have slightly tapered portions at the ends to increase the flux density in the gaps between the poles and it will also be noted, that the faces of the poles are curved as and for a purpose to be hereinafter described.

The reference character 16 designates a cable or electrical conductor carrying a current, and it is the current of this cable that is to be measured by the instrument herein shown. In carrying out the operation, the magnetic member 10 is adapted to surround the cable and means is provided to hold or support the same upon the cable 16. In the present embodiment of the invention, this means consists of two curved members 17 the shanks of which are slidably mounted as at 18 in brackets or the like 19 clamped by means of bolts or the like 20 upon the portions A and B of the magnetic member 10. Coil springs or the like 21 may be employed to maintain the members 17 in engagement with the cable 16.

An indicating means is provided and this indicating means comprises a scale or the like 30 mounted within a suitable housing 31 which in turn is connected to the portions A and B of the magnetic member 10 after the same has been adjusted in position upon the cable by means of clamps or the like comprising plates 33 and screws, bolts or the like 34.

This indicating means is bodily movable with respect to the magnetic member 10. Said indicating means carries a tubular extension 37 formed of non-conducting material which is adapted for movable engagement and disengagement in the gap between the poles 13 of the magnetic member 10. Means is provided whereby this indicating means may be adjustably fixed with relation to the magnetic member 10, and in the present embodiment of the invention this means comprises recesses or the like 38 in the outer side of the tubular member 37, said recesses 38 being connected by grooves 38x. Figures 2 and 4, and balls or similar pawl members 39 carried in tubes or the like 40 on the portion A and B and forced forwardly into engagement with the recesses 38 by means of springs or the like 41 the tension of which may be adjusted by screws or the like 42.

The grooves 38x alluded to serve in practice to facilitate the guiding of the tubular member 37, and retain the same in proper position relatively to the pawl members 39.

Thus it will be apparent that the adjusted position of the indicating means depends entirely upon the recesses 38 in which the balls 39 are engaged.

The indicating mechanism includes a pointer or the like 40' which is carried by a shaft 41' mounted in bearings 42'. This shaft 41' carries a member 44 (see Fig. 5) which is preferably a thin piece of iron or magnetic material and is influenced by the magnetic flux tending to complete the circuit between the poles 13 and thus causes movement of the shaft 41' about its axis in its bearings in the body 50 against the action of a coil spring 45 which serves to return the same to its normal position when the device is not influenced by current in the conductor 16.

It will be apparent from the foregoing that in the use of my device, range changing is accomplished in two or more steps which correspond to two or more positions of the magnetic material 44 within the gap, and from these two or more positions the two or more ranges of the instrument are obtained. By this is meant that if the instrument indicates say up to 500 amperes when the first recesses 38 of the tubular member 37 are lodged between the pawls 39, then in case the current in the conductor falls to a lower intensity, say three hundred amperes, by introducing the tubular member 37 a step further within the gap of the pole pieces, the sensitivity of the instrument is increased because more surface of the sensitive armature is exposed to the flux. It will also be apparent that my instrument has no wire wound coils, and can be used for current measurements on either direct or alternating current circuits and without the aid of current transformers or shunts, and when a conductor under test carries both direct and alternating currents my instrument is adapted to measure the sum of these currents simultaneously.

From the foregoing it is apparent that the present invention provides a new and novel device of the aforementioned character which is capable of attachment to cables or conductors of various sizes, and in which the measuring of the current in the conductor can be accurately and expeditiously accomplished by a single person.

While the invention has been herein disclosed in a preferred form, it is to be understood that the invention is not to be limited to the specific construction herein illustrated and that it may be practiced in other forms without departing from the spirit thereof.

Having thus described the invention, what is claimed as new and what is desired to secure by Letters Patent of the United States, is:

1. An electrical current testing instrument including a magnetic member comprising two portions pivotally connected together, and resilient coacting clamping means carried by each of said portions for gripping engagement with an electricity conductor to support the instrument therefrom with the electricity conductor in spaced relation to said members.

2. An electrical current testing instrument including a magnetic member having spaced pole-pieces, means removably carried by the magnetic member for removably attaching the instrument to an electricity conductor, said means comprising a pair of oppositely disposed coacting spring actuated gripping elements, and indicating means adjustably mounted between the pole-pieces of the magnetic member.

3. An electrical current testing instrument comprising a magnetic member including a pair of pivotally connected portions, the free ends terminating in pole pieces, coacting resilient clamping elements carried by said portions and extending inwardly toward each other and adapted for clamping engagement with an electrical conductor to be tested, an electrical indicating device, and means for electrically connecting and supporting said electrical indicating device between the pole ends of said portions.

4. An electric current testing instrument comprising a magnetic member including a pair of pivotally connected portions, the free ends terminating in pole pieces, brackets carried by said portions, opposed clamping jaws slidably mounted in said brackets, spring means tending to urge said clamping jaws toward each other, an electrical indicating device, and means for electrically connecting and supporting said electrical device between the pole ends of said portions.

5. In an electric current testing instrument and in combination, a magnetic member having spaced pole pieces, pawls carried by said member, and an indicating device having a tubular portion movable endwise between said pole pieces and pawls, said tubular portion having at spaced points in its length recesses to receive said pawls, and said indicating device also having a shaft turnable about its axis in said tubular portion, an armature in the tubular portion and on the shaft and movable with the shaft, a pointer on the shaft, a scale complementary to the pointer, and a spring co-operating with the shaft for returning the pointer to its initial position.

6. In an electric current testing instrument and in combination, a magnetic member having spaced pole-pieces, spring pressed balls carried by said member, and an indicating device having a tubular portion movable endwise between said pole-pieces and balls and also having at spaced points in the length of said tubular portion recesses to receive said spring pressed balls, and an armature, whereby the tubular portion and the armature are retained in predetermined longitudinal spaced relation to the pole-pieces along the depth of introduction of said tubular portion.

7. In an electric current testing instrument, and in combination, a magnetic member having spaced pole-pieces, spring pressed balls carried by said member, and an indicating device having a tubular portion movable endwise between said pole-pieces and balls and also having at spaced points in the length of said portion recesses to receive said balls and further having longitudinal grooves connecting said recesses, and an armature.

In testimony whereof I affix my signature.

GEORGE BASIL STANTON.